C. B. KING & C. B. WESTON.
OPERATING MECHANISM FOR FRICTION CLUTCHES.
APPLICATION FILED MAY 25, 1911.
1,039,755.
Patented Oct. 1, 1912.
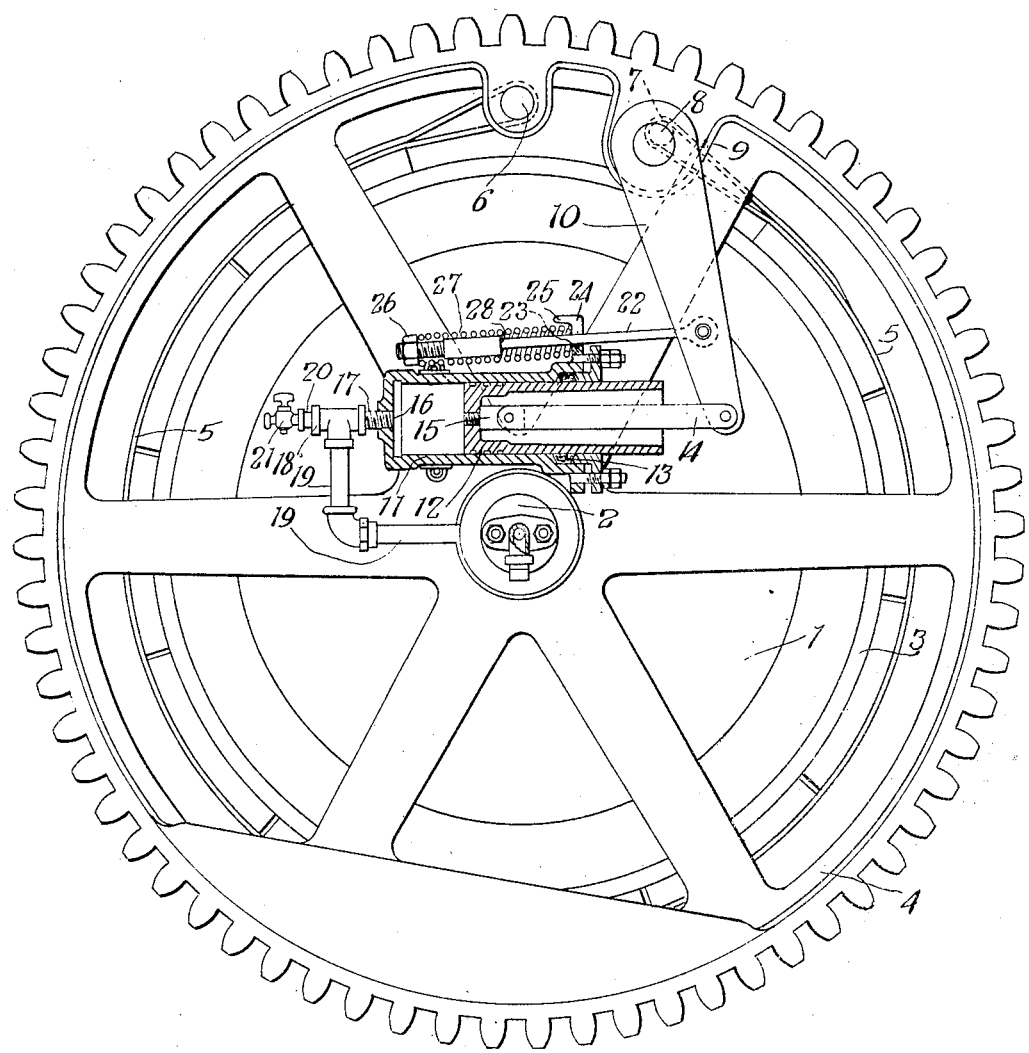
Inventors
Charles B. King,
Clarence B. Weston,

UNITED STATES PATENT OFFICE.

CHARLES B. KING AND CLARENCE B. WESTON, OF MARION, OHIO, ASSIGNORS TO THE MARION STEAM SHOVEL COMPANY, OF MARION, OHIO, A CORPORATION OF OHIO.

OPERATING MECHANISM FOR FRICTION-CLUTCHES.

1,039,755.   Specification of Letters Patent.   Patented Oct. 1, 1912.

Application filed May 25, 1911. Serial No. 629,255.

*To all whom it may concern:*

Be it known that we, CHARLES B. KING and CLARENCE B. WESTON, citizens of the United States, residing at Marion, in the county of Marion and State of Ohio, have invented certain new and useful Improvements in Operating Mechanism for Friction-Clutches, of which the following is a specification, reference being had therein to the accompanying drawing.

This invention relates to operating mechanism for friction clutches and is in the nature of an improvement upon Patent No. 666,348, granted Jan'y 22, 1901, to G. W. King and H. J. Barnhart and assigned to the assignee of the present invention.

The object of the invention is to provide a mechanism of this character of a very simple construction and comprising a minimum number of parts, which will be positive in its operation and will not be subjected to strain or undue wear in its operation.

The accompanying drawing is a side elevation of a rotary power transmitting member, showing the clutch operating mechanism in section.

As shown in this drawing the invention is applied to a friction clutch for connecting a rotary power transmitting member to a part to be operated. The part to be operated is, in the present instance, a drum 1 loosely mounted upon a shaft 2 and having at one end a flange or rim 3 constituting one member of the friction clutch. Rigidly secured to the shaft 2 is a rotary power transmitting member, such as gear 4. The second member of the friction clutch is carried by this gear and is in the nature of a friction band 5 secured at one end to a fixed part of the gear, as indicated at 6, and having its other end adjustably connected to the gear to enable the band to be tightened or loosened on the clutch member 3. In the form here shown this is accomplished by connecting the end of the friction band to a pin 7 eccentrically mounted on a shaft 8 journaled in a lug 9 carried by the gear 4. An operating arm 10 is rigidly secured to the shaft 8, and, by manipulating this arm, the friction band 5 can be tightened or loosened on the clutch member 3 carried by the drum 1 and this drum thereby connected to or disconnected from the power-transmitting member of the gear.

The operating mechanism for the clutch comprises a cylinder 11 rigidly secured to the gear 4, having one end closed and the other end open. Mounted within the cylinder 11 is a trunk piston 12, that is, a piston comprising a head and a cylindrical extension extending outwardly from the head and fitting snugly within the cylinder. In addition to the usual piston ring the outer end of the cylinder is provided with a packing gland 13 to prevent any leakage between the walls of the cylinder and the piston. This piston is connected with the operating arm 10 of the clutch mechanism by means of a piston rod or link 14 pivotally connected at one end to said arm, extending through the extension of the piston and pivotally connected to a lug 15 carried by the piston head within the hollow extension thereto. In this manner the piston rod is free to accommodate itself to the varying positions of the piston and the arm without any strain whatever being imposed thereon and the stuffing box for the piston rod in the end of the cylinder is entirely dispensed with. The closed end of the cylinder 11 communicates with a suitable source of fluid supply. In the present instance the cylinder is provided in its end with an inlet opening 16 having connected thereto a short pipe or nipple 17 provided with a T-coupling 18 to which is connected a pipe 19 leading to the source of fluid supply. In order that this fluid supply may be connected with the cylinder during the operation of the rotary gear the shaft 2 is preferably hollow and the supply pipe mounted therein. This feature of construction is similar to that shown and described in the above-mentioned patent and forms no part of the present invention. The fluid supply is controlled by suitable valve mechanism which is not here shown. The third branch of the T-coupling 18 is closed by a hollow plug 20 provided with a pet-cock 21. By utilizing the T-coupling at this point I provide means whereby a lubricant can be readily injected into the cylinder and I further provide means for draining the same. To accomplish this latter object it is only necessary to open the pet-cock 21 and move the cylinder into a vertical position with the pet-cock extending downward.

The outward movement of the piston 12 is positively limited and means are provided for returning the same to its innermost or foremost position. As here shown, a rod 22 is pivotally connected to the operating arm 10 for the clutch mechanism at a point between the ends thereof. This rod extends through a suitable guide mounted on a part of the mechanism fixed with relation to the arm, which, in the present instance, comprises a lug 23 rigidly secured to the cylinder 11 and having its outer end slotted, as indicated at 24, and provided with a flange or projection 25. The rod 22 extends through the slot in the lug 23 and has a nut 26 screw-threaded on the free end thereof. A spring 27 is coiled about the rod between the nut 26 and the lug 23 and tends to move the piston toward its normal position. A stop is carried by the rod 22 to limit its outward movement and this, in the present device, comprises a shoulder 28 formed on the rod 22 and adapted to engage the lug 23 on the opposite sides of the slot 24.

The operation of the mechanism will be readily understood from the foregoing description and it will be apparent that we have provided a mechanism of this character which is very simple in its construction comprising a minimum number of parts and having these parts so arranged that they will not be subjected to strain or undue wear, this latter being particularly true of the piston and piston rod. Further, it will be noted that means are provided, without the formation of additional openings in the cylinder, for injecting lubricant into the same and for draining said cylinder.

While we have herein illustrated one form of our invention and have shown the same applied to a friction clutch, it will be apparent that the construction of the mechanism can be altered and that the invention can be applied to devices other than the friction clutch. We, therefore, wish it to be understood that we do not desire to be limited to the details of construction shown and described, for obvious modifications will occur to one skilled in the art.

Having thus fully described our invention, what we claim as new and desire to secure by Letters Patent, is:—

1. The combination, with a rotary power transmitting member, a clutch member carried thereby, and an arm operatively connected with said clutch member, of a cylinder mounted on said power transmitting member having one end open, a piston mounted in said cylinder and comprising a head having a cylindrical extension, a piston rod pivotally connected to said piston at one end and connected at its other end with said arm, means for admitting fluid to said cylinder at the closed end thereof, coöperating parts connected with said cylinder and said arm, respectively, to positively limit the outward movement of said piston, and means to return said piston to its normal position.

2. The combination, with a rotary power transmitting member, a clutch member carried thereby, and an arm operatively connected with said clutch member, of a cylinder mounted on said power transmitting member, having one end open and having a fluid inlet at the other end thereof, a piston mounted in said cylinder, a piston rod pivotally connected to said piston and to said operating arm, a lug mounted on a part of said mechanism fixed with relation to said cylinder and having an opening therein, a rod pivotally connected to said operating arm, extending through said opening and having a part to engage said lug and limit the outward movement thereof, and a spring connected with said rod to return said piston to its normal position.

3. The combination, with a rotary power transmitting member, a friction band carried thereby, and an arm operatively connected with said band, of a cylinder mounted on said power transmitting member and having one end open, and a fluid inlet at the opposite end thereof, a piston mounted in said cylinder comprising a head and cylindrical extension, a piston rod extending through said extension and pivotally connected to said head at its inner end and pivotally connected to said operating arm at its outer end, a lug rigidly secured to said cylinder and having its outer end slotted and provided with a flange, a rod pivotally connected to said operating arm, extending through said slot and provided on its free end with a nut, a spring coiled about said rod and adapted to engage said lug beneath said flange, said rod having a shoulder adapted to engage said lug on opposite sides of said slot.

4. The combination, with a rotary member, and a clutch member carried thereby, a cylinder mounted on said rotary member, having one end open and having a packing gland near its open end, a piston mounted in said cylinder and comprising a cylindrical portion extending beyond said packing gland, a piston rod pivotally connected at one end to said piston and operatively connected at its other end with said clutch member, means to admit fluid to said cylinder at the closed end thereof, and means to positively limit the outward movement of said piston.

5. The combination, with a rotary member, a clutch member mounted thereon, and an arm operatively connected to said clutch member, of a cylinder mounted on said rotary member and having one end open, a piston mounted in said cylinder, a piston rod connecting said piston to said operating arm, means to positively limit the outward movement of said piston, a fluid supply pipe connected with the closed end of said cylinder, a drain cock communicating with said cylinder through a portion of said supply pipe, whereby the rotation of said rotary member will move said cylinder into a position to cause it to drain through its supply pipe.

6. The combination, with a rotary member, a clutch member mounted thereon, and an arm operatively connected to said clutch member, of a cylinder mounted on said rotary member and having one end open, a piston mounted in said cylinder, a piston rod connecting said piston to said operating arm, means to positively limit the outward movement of said piston, a nipple mounted in the closed end of said cylinder, a T-coupling carried by said nipple, a supply pipe connected to one branch of said coupling, and a drain cock connected to the other branch thereof, whereby said rotary member may be moved to bring said cylinder into a position to cause it to drain through said nipple.

In testimony whereof, we affix our signatures in presence of two witnesses.

CHARLES B. KING.
CLARENCE B. WESTON.

Witnesses:
H. L. GURLEY,
N. E. CRISSINGER.